(12) United States Patent
Shimizu et al.

(10) Patent No.: US 6,752,424 B2
(45) Date of Patent: Jun. 22, 2004

(54) CABLE TYPE STEERING SYSTEM

(75) Inventors: Yasuo Shimizu, Saitama (JP); Koichi Suyama, Saitama (JP); Katsuji Watanabe, Saitama (JP); Atsuhiko Yoneda, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 61 days.

(21) Appl. No.: 10/268,368

(22) Filed: Oct. 10, 2002

(65) Prior Publication Data

US 2003/0071450 A1 Apr. 17, 2003

(30) Foreign Application Priority Data

Oct. 16, 2001 (JP) .................................... P. 2001-317684

(51) Int. Cl.$^7$ .............................. B62D 1/00; B62D 5/04
(52) U.S. Cl. ....................................... 280/771; 180/444
(58) Field of Search ................................ 180/405, 407, 180/443, 444, 446; 280/771, 93.513, 93.514, 93.515

(56) References Cited

U.S. PATENT DOCUMENTS

| | | | | |
|---|---|---|---|---|
| 2,673,091 A | * | 3/1954 | Planalp | 280/103 |
| 3,669,466 A | * | 6/1972 | Spence | 180/409 |
| 4,047,494 A | * | 9/1977 | Scott | 440/42 |
| 4,054,102 A | * | 10/1977 | Borst et al. | 114/144 R |
| 4,449,420 A | * | 5/1984 | Baba | 74/501.6 |
| 4,735,165 A | * | 4/1988 | Baba et al. | 114/144 R |
| RE34,852 E | * | 2/1995 | Burroughs | 440/63 |
| 5,924,517 A | * | 7/1999 | Sugiura | 180/417 |
| 5,924,519 A | * | 7/1999 | Shimizu et al. | 180/444 |
| 5,996,723 A | * | 12/1999 | Shimizu et al. | 180/444 |
| 6,116,371 A | * | 9/2000 | Suyama et al. | 180/444 |

FOREIGN PATENT DOCUMENTS

| | | |
|---|---|---|
| JP | 08-002431 | 1/1996 |
| JP | 10-059197 | 3/1998 |
| JP | 2000-025623 | 1/2000 |

\* cited by examiner

*Primary Examiner*—Paul N. Dickson
*Assistant Examiner*—Laura B. Rosenberg
(74) *Attorney, Agent, or Firm*—Carrier, Blackman & Associates, P.C.; Joseph P. Carrier; William D. Blackman

(57) ABSTRACT

A cable type steering system includes a drive pulley coupled to a steering wheel for rotation and having a drive pulley main body, a driven pulley coupled to a steering gear box for steering wheels for rotation and having a driven pulley main body, and an operation cable connecting the drive pulley with the driven pulley, so that a steering torque inputted to the steering wheel is transmitted to the steering gear box via the operation cable. At least one of the drive pulley main body and the driven pulley main body may be molded of a synthetic resin in such a manner as to cover a detent portion formed on an outer circumference of a pulley boss made of a metal both from an axial direction and a radial direction, and at least part of the covered detent portion is visible from outside of the covering pulley main body.

9 Claims, 6 Drawing Sheets

… , …

CABLE TYPE STEERING SYSTEM

BACKGROUND OF THE INVENTION

1. Field of the Invention

The present invention relates to a cable type steering system in which a steering wheel and a steering gear box are connected to each other with flexible operation cables such as a Bowden cable. More particularly, the present invention relates to a cable type steering system wherein a detent portion formed on an outer circumference of a pulley boss is visible even when using molded drive pulley and driven pulley main bodies.

2. Description of the Related Art

The cable type steering system is disclosed in, for example, JP-A-2000-25623, JP-A-10-59197 and JP-A-8-2431.

In this type of cable type steering system, even in a case where a drive pulley main body and a driven pulley main body are made of a synthetic resin in order to reduce the weight of the steering system, a pulley boss constituting a rotating shaft thereof needs to be made of a metal due to the reason for ensuring a required strength. In this case, it is contemplated to rigidly integrate a pulley main body made of a synthetic resin onto an outer circumference of the metallic pulley boss and to integrally mold a pulley main body of a synthetic resin in such a manner as to cover a detent portion formed on the outer circumference of a boss portion from an axial direction and a radial direction in order to prevent the generation of looseness.

In the event that the pulley main body of a synthetic resin is integrally molded over the outer circumference of the metallic pulley boss as has been described above, if no detent portion is formed on the outer circumference of the pulley boss due to a processing error, there is caused a concern that when a large magnitude of steering torque is applied thereto, the steering torque is not sufficiently transmitted. However, there is caused a problem that once the pulley boss is covered with the pulley main body, the condition of the detent portion on the pulley boss cannot be confirmed from the outside of the pulley main body.

SUMMARY OF THE INVENTION

The invention was made in view of the above situation, and an object thereof is to provide a cable type steering system in which one can surely confirm the condition of a detent portion on a pulley boss which is covered with a pulley main body of a cable type steering system.

With a view to attaining the object, according to a first aspect of the invention, there is provided a cable type steering system in which a drive pulley coupled to a steering wheel for rotation and a driven pulley coupled to a steering gear box for steering wheels for rotation are connected by operation cables so that a steering torque inputted to the steering wheel is transmitted to the steering gear box via the operation cables. The cable type steering system of this first aspect is characterized in that at least one of a drive pulley main body and a driven pulley main body is molded of a synthetic resin in such a manner as to cover detent portion(s) formed on outer circumference(s) of associated pulley boss (es) made of, for example, metal both from an axial direction and a radial direction, and in that at least part of the covered detent portion(s) can be visualized from outside of the covering pulley main body.

According to the construction, since at least part of the detent portions formed on the outer circumferences of the metallic pulley bosses can be visualized from the outside of the drive pulley main body or the driven pulley main body which is molded of the synthetic resin in such a manner as to cover the detent portions, it is possible to ensure confirmation of any absence of formation of a detent portion on the pulley boss due to a processing error.

According to a second aspect of the invention, there is provided a cable type steering system as set forth in the first aspect of the invention, wherein at least part of the detent portions can be visualized through recessed portions formed for fixing end portions of the operation cables to the drive pulley main body or the driven pulley main body.

According to the construction, since part of the detent portions can be visualized through the recessed portions formed for fixing the end portions of the operation cables to the drive pulley main body or the driven pulley main body, it is possible to ensure confirmation of existence of the detent portions on the pulley bosses without implementing any particular or extra processing to the pulley main bodies.

Note that serrated portions 33a, 71a in an embodiment correspond to the detent portions of the invention and pin holes 34a, 77a in the embodiment correspond to the recessed portions of the invention.

DETAILED DESCRIPTION OF THE INVENTION

Modes for carrying out the invention will be described based on embodiments illustrated in the accompanying drawings.

Figure 1:
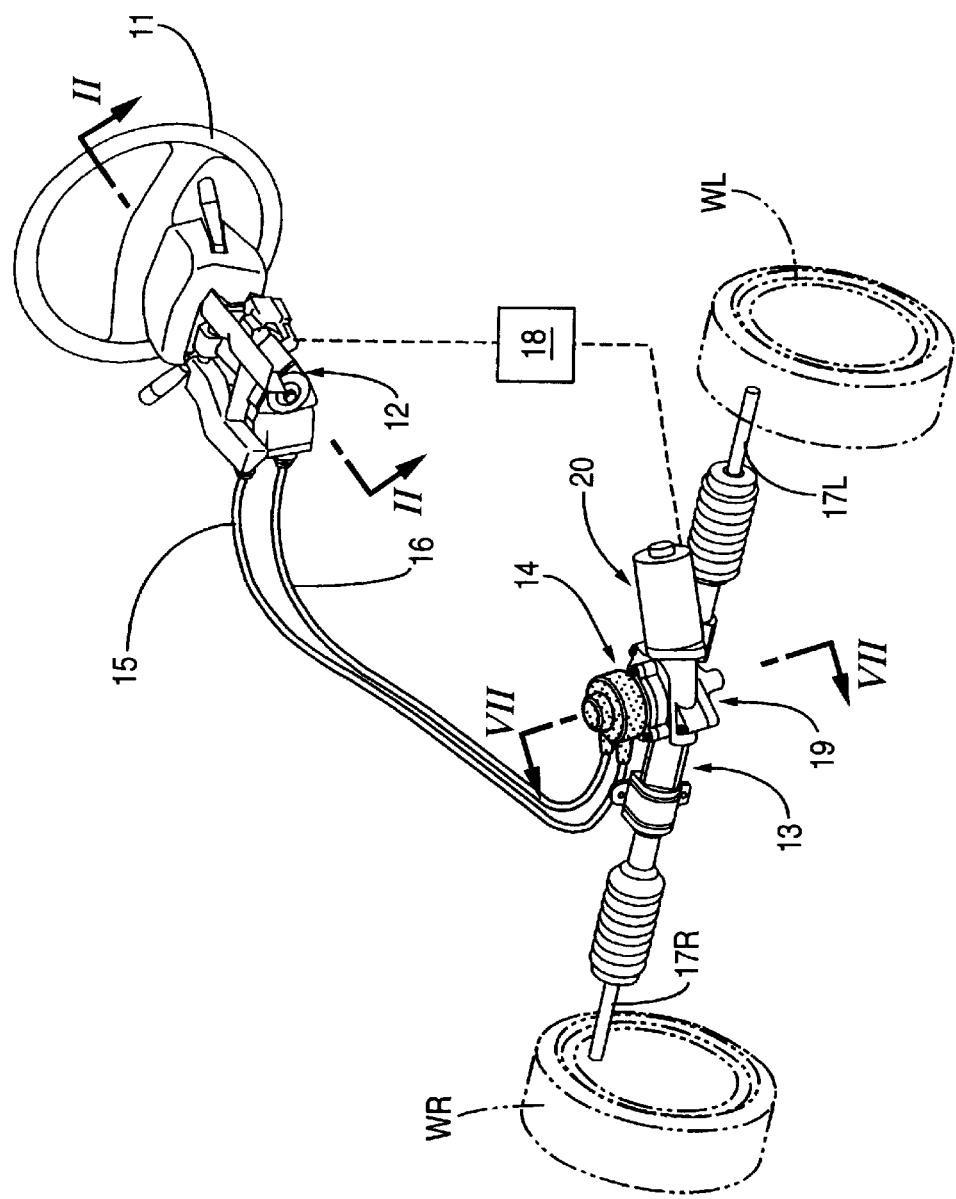
FIG. 1 is an overall perspective view of a cable type steering system.

FIGS. 1 to 7 show a first embodiment of the invention. As shown in FIG. 1, a drive pulley casing 12 provided in front of an automotive steering wheel 11 and a driven pulley casing 14 provided above a steering gear box 13 are connected to each other by two operation cables 15, 16 each comprising a Bowden cable. Tie rods 17L, 17R extending from end portions of the steering gear box 13 in transverse directions of a vehicle body are connected, respectively, to knuckles (not shown) which support left and right wheels WL, WR. A steering torque sensor is incorporated in the drive pulley casing 12 for detecting a steering torque which is inputted in the steering wheel 11. An actuator 20 provided in a gear casing 19 which is integral with the driven pulley casing 14 is actuated by a command from a control unit 18 into which a steering torque so detected by the steering torque sensor is inputted, so that the steering operation by the driver is assisted.

Figure 2:
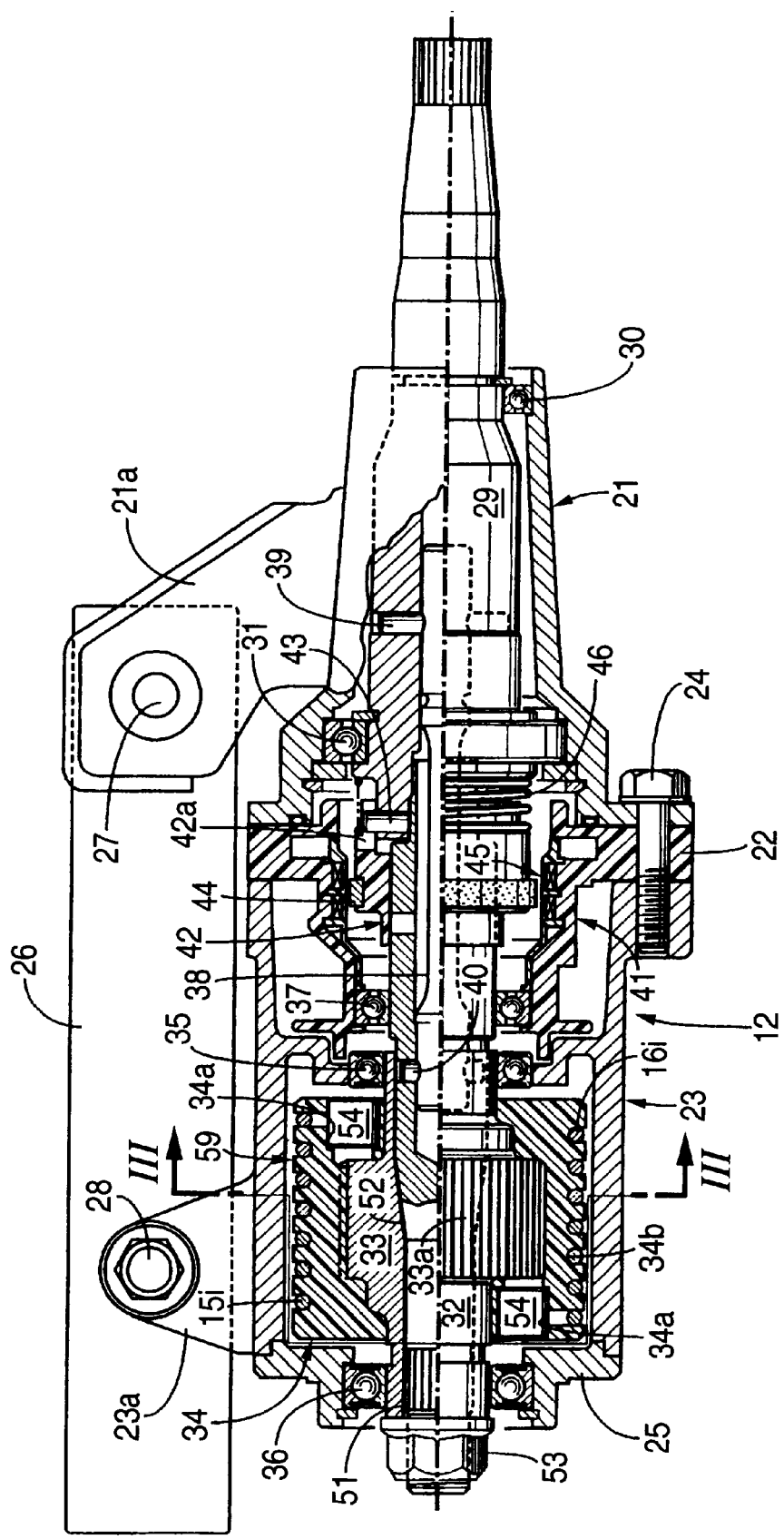
FIG. 2 is an enlarged sectional view taken along the line II—II in FIG. 1.

As shown in FIG. 2, the drive pulley casing 12 includes a rear housing 21, a center housing 22 and a front housing 23, which are connected together with bolts 24 . . . , and a front cover 25 is connected to a front face of the front housing 23 with bolts (not shown). The drive pulley casing 12 is mounted to a mount stay 26 such that a bracket 21a provided on the rear housing 21 is fixed to the mount stay 26 with a pin 27 whereas a bracket 23a provided on the front housing 23 is fixed to the mount stay 26 with a pin or bolt 28.

A hollow steering shaft 29 connected to the steering wheel 11 is rotatably supported in the rear housing 21 with two ball bearings 30, 31. A metallic pulley boss 33 is fixed to an outer circumference of a hollow pulley shaft 32 disposed coaxially with the steering wheel 11, and a drive pulley main body 34 which is formed of a synthetic resin is integrally molded in such a manner as to cover a serrated portion 33a formed in an outer circumference of the pulley boss 33. The pulley boss 33 is rotatably supported at end portions thereof by two ball bearings 35, 36 in the front housing 23 and the front cover 25, respectively, and the pulley shaft 32 is rotatably supported by a ball bearing 37 in the center housing 22. The pulley boss 33 and the drive pulley main body 34 construct a drive pulley 59 according to the invention.

An inner circumference of a front end portion of the steering shaft 29 fits in an outer circumference of a rear end portion of the pulley shaft 32 in such a manner as to rotate relative to the pulley shaft 32, and end portions of a torsion bar 38 fit in hollow portions of the steering shaft 29 and the pulley shaft 32, respectively, and are connected to the respective shafts with pins 39, 40. Consequently, a steering torque inputted into the steering shaft 29 is transmitted from the steering shaft 29 to the pulley shaft 32 via the torsion bar 38, whereby a steering torque sensor 41 provided in the interior of the center housing 22 detects the steering torque based on a twist amount of the torsion bar 38.

Figure 4:
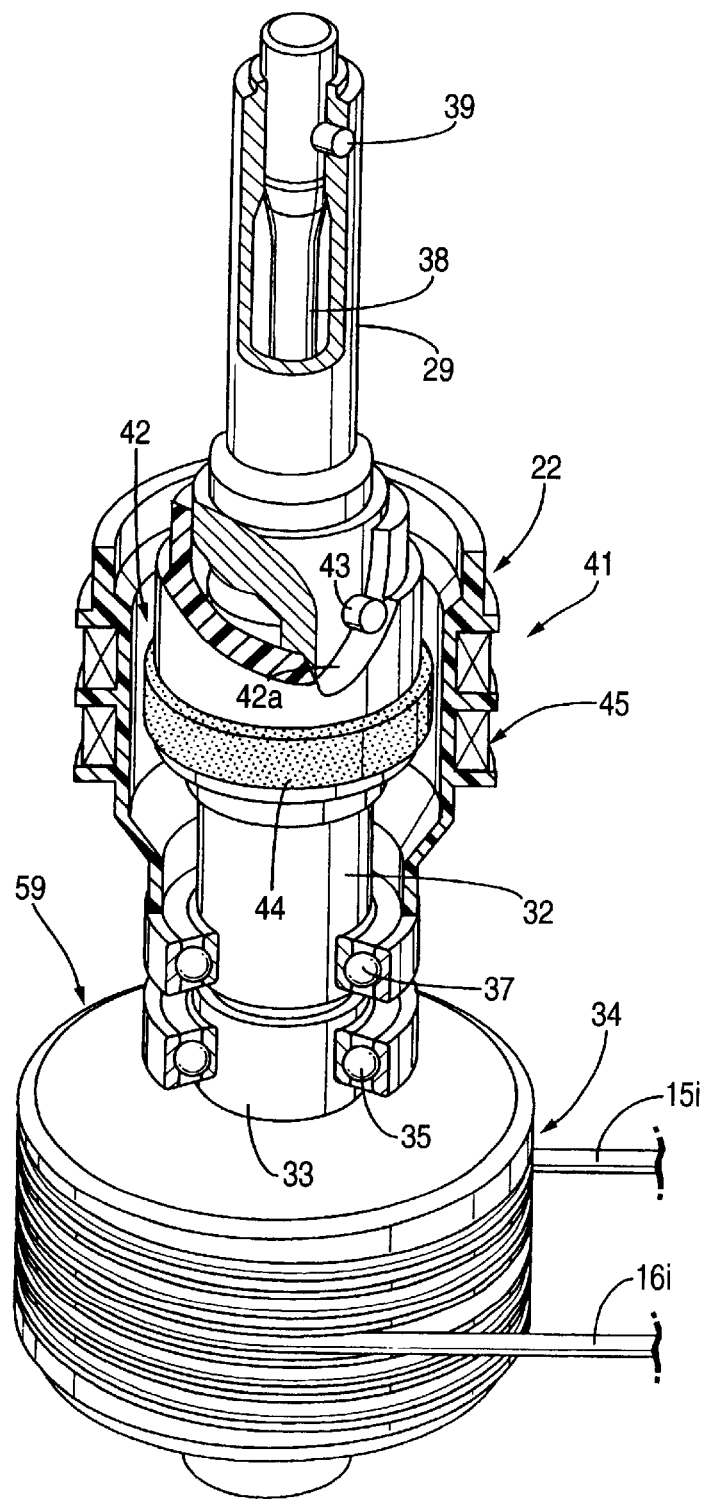
FIG. 4 is a perspective view of a steering torque sensor.

As is understood from FIGS. 2 and 4, the steering torque sensor 41 includes a cylindrical slider 42, a guide pin 43, a magnetic ring 44, a differential transformer 45 and a coil spring 46. The cylindrical slider 42 is supported on the pulley shaft 32 in such a manner as not to rotate relative to the outer circumference of the pulley shaft 32 but to slide in axial directions thereof. The guide pin 43 is fixed to the steering shaft 29 and adapted to fit in an inclined groove 42a formed in the slider 42. The magnetic ring 44 is fixed to an outer circumference of the slider 42 which is made of a synthetic resin. The differential transformer 45 is fixed to an inner circumference of the center housing 22 in such a manner as to confront the magnetic ring 44. The coil spring 46 biases the slider 42 to the front in order to prevent a looseness between the guide pin 43 and the inclined groove 42a.

Figure 5:
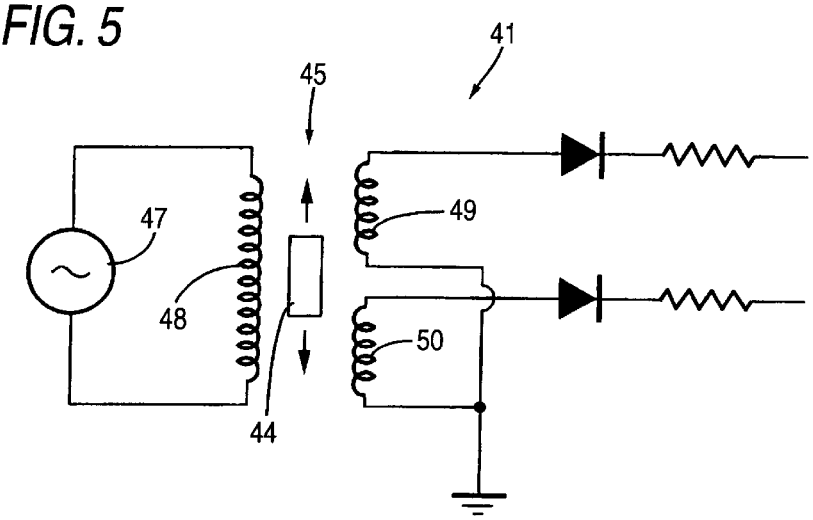
FIG. 5 is a circuit diagram of a differential transformer for the steering torque sensor.

As shown in FIG. 5, the differential transformer 45 of the steering torque sensor 41 comprises a primary coil 48 connected to an alternating-current power supply 47, a first secondary coil 49 and a second secondary coil 50. The magnetic ring 44 constitutes a movable iron core disposed between the first and second secondary coils 49, 50.

As is understood from FIG. 2, a front end portion of the pulley shaft 32 and the pulley boss 33 are connected to each other at a serrated connecting portion 51, as well as via a tapered connecting portion 52 which tapers toward the front end portion of the pulley shaft 32. A nut 53 is screwed on a front end of the pulley shaft 32, so that the pulley boss 33 is biased rearward along the pulley shaft 32 by virtue of a load from the nut 53, whereby the boss 33 is brought into close contact with the tapered connecting portion 52 with a sufficient surface pressure, thereby making it possible to bring the pulley shaft 32 and the pulley boss 33 into rigid integration. This serves to eliminate minute looseness existing at the serrated connecting portion 51, whereby not only can the generation of noise be suppressed, but also the steering feel can be improved. Since the drive pulley 59 can move axially when the nut 53 is tightened, the application of an unreasonable force to the drive pulley casing 12 is prevented.

Figure 3:
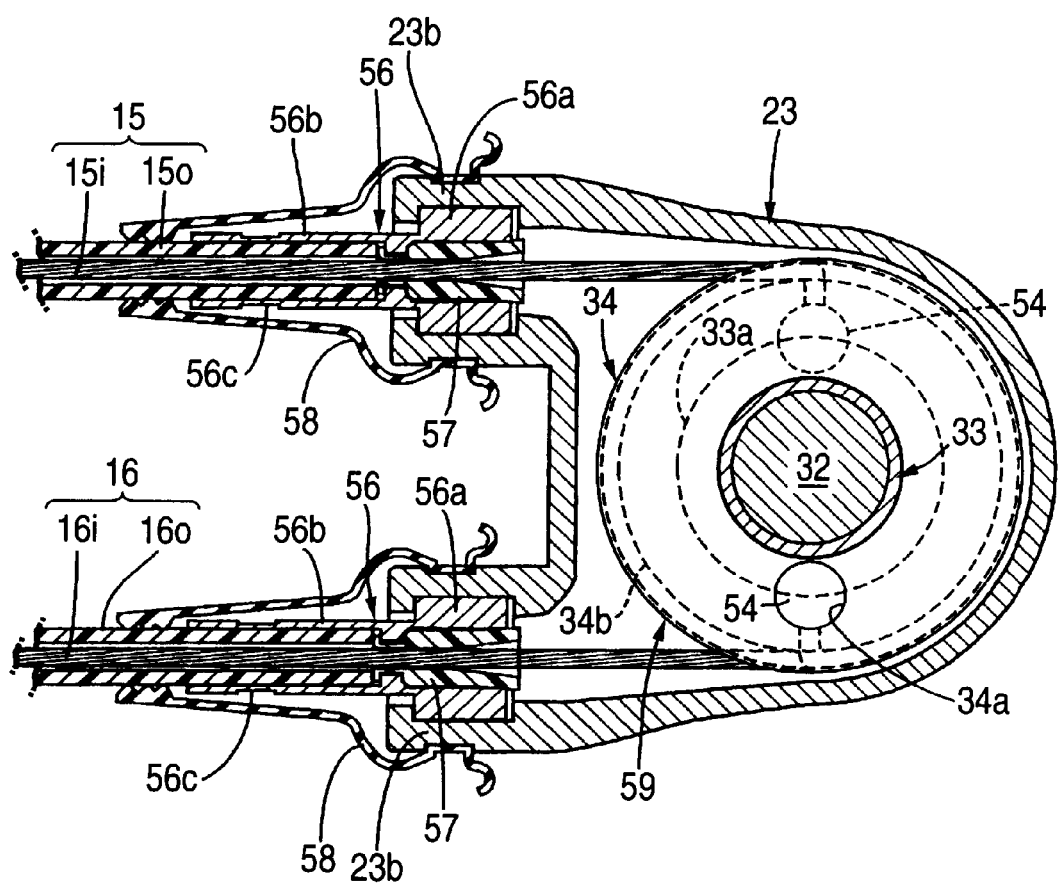
FIG. 3 is a cross-sectional view taken along the line III—III in FIG. 2.

As understood from FIGS. 2 and 3, the two operation cables 15, 16 are constituted by outer tubes 15o, 16o which are made of a synthetic resin, and inner cables 15i, 16i comprising metallic strands which are slidably received in the interior of the respective outer tubes 15o, 16o. Short cylindrical pins 54, 54 fixed to end portions of the two inner cables 15i, 16i fit in pin holes 34a, 34a formed in end faces of the drive pulley main body 34. The two inner cables 15i, 16i extending from the pins 54, 54 are wound around an outer circumference of the drive pulley main body 34 along a single spiral groove 34b formed in the outer circumference of the drive pulley main body 34 in directions in which the cables approach each other and are then drawn out in a direction which intersects with an axis of the pulley shaft 32 at right angles.

Bottom portions of the pin holes 34a, 34a of the drive pulley main body 34 made of, for example, synthetic resin reach a boundary portion between the serrated portion 33a of the pulley boss 33 and the drive pulley main body 34, and with the pins 54, 54 being removed, the boundary portion can easily be visualized. Consequently, the detection of a processing error can be ensured in which a drive pulley main body 34 is molded in an inappropriate condition where no serrated portion 33a is formed in a pulley boss 33.

Two cylindrical connecting portions 23b, 23b are formed on the front housing 23, and boss portions 56a, 56a of outer tube connecting members 56, 56 are fixed in the interior of the respective connecting portions 23b, 23b. Pipe portions 56b, 56b extending from the boss portions 56a, 56a outwardly of the connecting portions 23b, 23b fit on outer circumferences of the outer tubes 15o, 16o and the operation cables 15, 16 are clamped on clamp portions 56c, 56c, whereby end portions of the outer tubes 15o, 16o are fixed to the front housing 23. Guide bushes 57, 57 made of a synthetic resin providing good sliding characteristics are retained on inner circumferences of the boss portions 56a, 56a of the outer tube connecting members 56, 56 in order to prevent the direct abrasion of the inner cables 15i, 16i and the boss portions 56a, 56a.

Covers made from, for example, rubber 58, 58 cover from outer circumferences of the connecting portions 23b, 23b of the front housing 23 to predetermined positions (for example, to portions which are exposed from the pipe portions 56b, 56b of the outer tube connecting members 56, 56) on the outer tubes 15o, 16o of the operation cables 15, 16. The rubber covers 58, 58 having an elasticity are closely secured to the outer circumferences of the connecting portions 23b, 23b of the front housing 23 and outer circumferences of the outer tubes 15o, 16o to seal off those portions, to thereby prevent water from penetrating from the clamp portions 56c, 56c of the outer tube connecting members 56, 56 for connecting the outer tubes 15o, 16o to the front housing 23, as well as gaps between the boss portions 56a, 56a of the outer tube connecting members 56, 56 and the connecting portions 23b, 23b.

Since the two ball bearings 35, 36 for supporting the pulley boss 33 are waterproof type, there is no risk that water penetrates into an interior space formed by the front housing 23 and the front cover 25 where the drive pulley 59 is accommodated to thereby get the drive pulley 59 wet. Thus, as has been described above, since the part extending from the drive pulley 59 to the predetermined positions of the outer tubes 15o, 16o is accommodated in the closed space, not only even in the event that the drive pulley casing 12 is disposed in an engine compartment of a vehicle and is splashed with water existing on the road surface, but also even in the event that the drive pulley casing 12 is disposed in a passenger compartment of the vehicle and is wet by a drink spilt by the driver or passenger, it is possible to prevent the interruption of smooth motion of the operation cables 15, 16 that occurs when water or other liquid adheres to the slide portions of the outer tubes 15o, 16o and the inner cables 15i, 16i and is frozen thereat when the temperature is low, as well as the deterioration in durability of the operation cables 15, 16 that occurs when the inner cables 15i, 16i rust due to water or liquid so adhering thereto.

Figure 7:
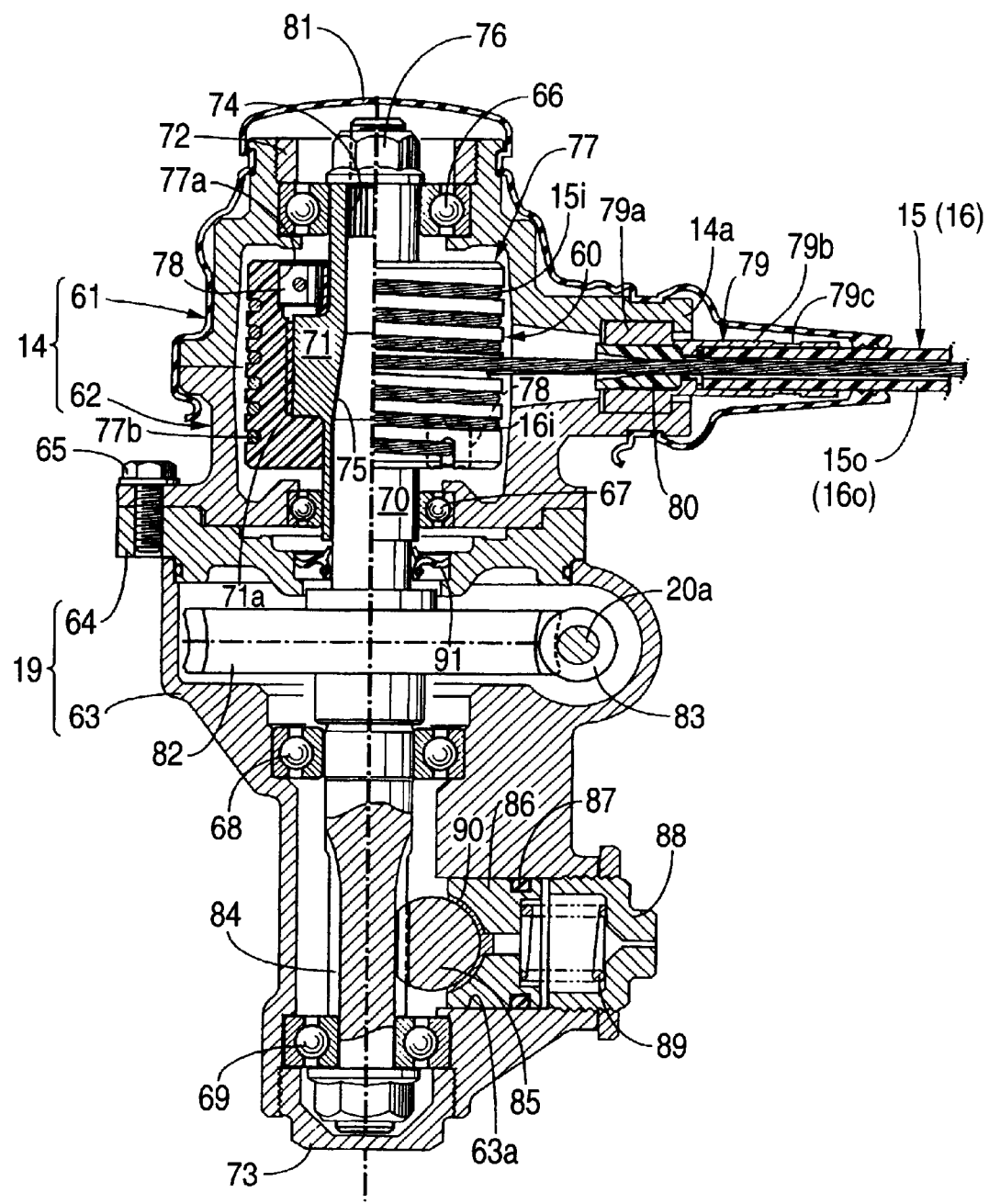
FIG. 7 is an enlarged sectional view taken along the line VII—VII in FIG. 1.

As shown in FIG. 7, the driven pulley casing 14 includes an upper housing 61 and a lower housing 62 which are connected to each other with bolts (not shown) and the gear casing 19 includes a gear casing main body 63 and an upper cover 64 which is connected to an upper face of the gear casing main body 63 with bolts (not shown). Then, the lower housing 62 and the upper cover 64 are connected together with a plurality of bolts 65 . . . .

A pulley shaft 70 is rotatably supported on a ball bearing 66 provided in the upper housing 61, a ball bearing 67 provided in the lower housing 62 and two ball bearings 68, 69 provided in the gear casing main body 63. The two ball bearings 66, 67 on an upper side do not directly bear the pulley shaft 70 but bear a pulley boss 71 fixed to an outer circumference of the pulley shaft 70. The ball bearing 66 provided in the upper housing 61 is prevented from coming off by an annular nut 72, and the lower ball bearing 69 provided in gear casing main body 63 is prevented from coming off by a cap nut 73.

An upper end portion of the pulley shaft 70 and the pulley boss 71 are connected together at a serrated connecting portion 74, as well as via a taper connecting portion 75 which tapers toward the upper end portion of the pulley shaft 70. A nut 76 is screwed on an upper end of the pulley shaft 70, and the pulley boss 71 is biased downwardly along the pulley shaft 70 by virtue of a load from the nut 76, so that the taper connecting portion 75 is brought into close contact with the pulley shaft 70 with a sufficient surface pressure, whereby the pulley shaft 70 and the pulley boss 71 are brought into rigid integration. Thus, not only can the generation of noise be suppressed by eliminating minute looseness existing at the serrated connecting portion, but also the steering feel can be improved. Since the driven pulley 60 is allowed to move in an axial direction when the nut 76 is tightened, the application of an unreasonable force to the driven pulley casing 14 and the gear casing 19 can be prevented.

A driven pulley main body 77 made of a synthetic resin is integrally molded on the serrated portion 71a of an outer circumference of the pulley boss 71. Short cylindrical pins 78, 78 fixed to end portions of the inner cables 15i, 16i of the two operation cables 15, 16 fit in pin holes 77a, 77a formed in both end faces of the driven pulley main body 77. The two inner cables 15i, 16i extending from the pins 78, 78 are wound around an outer circumference of the driven pulley main body 77 along a spiral groove 77b formed in the outer circumference of the driven pulley main body 77 in directions in which the inner cables 15i, 16i approach each other and are then drawn out in a direction which intersects with an axis of the pulley shaft 70 at right angles. The pulley boss 71 and the driven pulley main body 77 constitute a driven pulley 60.

Bottom portions of the pin holes 77a, 77a in the driven pulley main body 77 made of synthetic resin reach a boundary portion between the serrated portion 71a of the pulley boss 71 and the driven pulley main body 77, and with the pins 78, 78 being removed, the boundary portion can easily be visualized. Consequently, the detection of a processing error can be ensured in which a driven pulley main body 77 is molded in a condition where a serrated portion 71a is not formed in a pulley boss 71.

Two cylindrical connecting portions 14a, 14a are formed on the driven pulley casing 14, and boss portions 79a, 79a of outer tube connecting members 79, 79 are fixed inside the connecting portions 14a, 14a, respectively. Pipe portions 79b, 79b extending from the boss portions 79a, 79a to the outside of the connecting portions 14a, 14a fit on outer circumferences of outer tubes 15o, 16o and the operating cables 15, 16 are clamped on clamp portions 79c, 79c, whereby end portions of the outer tubes 15o, 16o are fixed to the driven pulley casing 14. Guide bushes 80, 80 made of a synthetic resin providing good sliding characteristics are retained on an inner circumference of the boss portions 79a, 79a of the outer tube connecting members 79, 79 for preventing the direct abrasion of the inner cables 15i, 16i and the boss portions 79a, 79a.

A single rubber cover 81 covers from most of the driven pulley casing 14 and extends to predetermined positions (for example, to portions which are exposed from the pipe portions 79b, 79b of the outer tube connecting members 79, 79) of the outer tubes 15o, 16o of the operation cables 15, 16 via the connecting portions 14a, 14a. This rubber cover 81 can not only ensure the sealing of the clamp portions 79c, 79c of the outer tube connecting members 79, 79 from which water penetrates most easily, but also prevent the penetration of water from a split face between the upper housing 61 and the lower housing 62 of the driven pulley casing 14, and the ball bearing 66 which supports the upper end of the pulley shaft 70.

With this construction, the waterproofness of the driven pulley casing 14, which is disposed at a lower portion in the engine compartment and hence is easier to get wet than the drive pulley housing 12, can be increased, whereby it is possible to prevent the interruption of smooth movement of the operation cables 15, 16 that occurs when water adheres to the slide portions of the outer tubes 15o, 16o and the inner cables 15i, 16i and is then frozen when the temperature is decreased, and the deterioration in durability of the operation cables 15, 16 that occurs when the inner cables 15i, 16i get rusted due to the water so adhering to the slide portions of the inner cables 15i, 16i.

A worm wheel 82 fixed to the pulley shaft 70 meshes with a worm 83 fixed to an output shaft 20a of the actuator 20 (refer to FIG. 1) which is constituted by an electric motor, at an upper portion of the gear casing 19 which is sealed off from the driven pulley casing 14 via a seal member 91. A rack 85 formed on the steering gear box 13 (refer to FIG. 1) meshes with a pinion 84 formed on a lower portion of the pulley shaft 70, and the rack 85 is biased toward the pinion 84 at the meshing portion.

Namely, a slide member 86 slidably fits in a through hole 63a formed in the gear casing main body 63 via an O ring 87, and a low-friction member 90 provided on the slide member 86 is brought into abutment with a back of the rack 85 by virtue of the spring force of a coil spring 89 disposed between a spring seat 88 screw-connected in the through hole 63a and the slide member 86. Accordingly, the rack 85 is prevented from being subjected to a large magnitude of sliding resistance and therefore, no looseness and deflection thereof is generated when the rotation of the pulley shaft 70 is transmitted to the rack 85 via the pinion 84 to steer the wheels WL, WR, the smooth operation of the rack 85 being thereby made possible.

Next, the function of the embodiment of the invention which is constructed as has been described heretofore will be described.

A steering torque detected by the steering torque sensor 41 is inputted in the control unit 18, which controls the operation of the actuator 20 based on the steering torque so detected. Namely, when the steering wheel 11 is operated to turn the vehicle, as shown in FIG. 2, the steering torque is transmitted to the pulley shaft 32 via the steering shaft 29 and the torsion bar 38, and one of the inner cables 15$i$, 16$i$ of the operation cables 15, 16 which are wound around the drive pulley main body 34 is pulled whereas the other of the inner cables 15$i$, 16$i$ is loosened, whereby the rotation of the drive pulley 59 is transmitted to the driven pulley 60. As a result, the pulley shaft 70 shown in FIG. 7 rotates, and the steering torque is transmitted to the wheels WL, WR via the pinion 84 and the rack 85 within the steering gear box 13 and the tie rods 17L, 17R.

When no steering torque is inputted to the steering wheel 11 the torsion bar 38 neither twists nor deforms, and the steering shaft 29 and the pulley shaft 32 are held in the same phase. As this occurs, as shown in FIG. 6B, the guide pin 43 of the steering shaft 29 is situated at the center of the inclined groove 42$a$, and the slider 42 is held at a vertically central position. Then, as shown in FIG. 5, the magnetic ring 44 provided on the slider 42 is situated at an intermediate position between the first secondary coil 49 and the second secondary coil 50, whereby output voltages from the two secondary coils 49, 50 becomes equal, and the steering torque is detected as being zero.

Figure 6A:
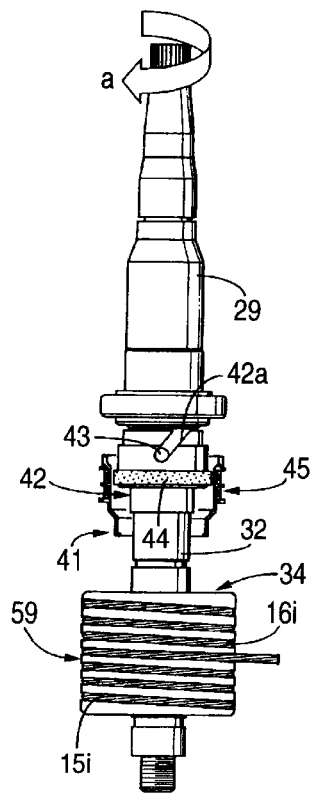
FIGS. 6A to 6C are explanatory views explaining the function of the steering torque sensor.
Figure 6B:
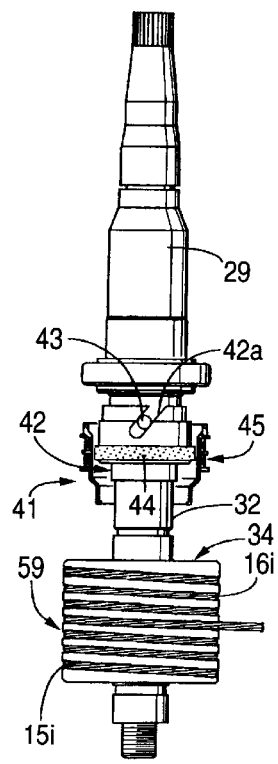
Figure 6C:
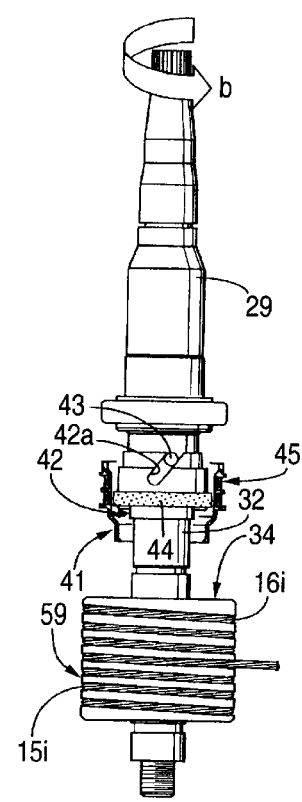

In addition, when the steering wheel 11 is operated rightward so that a steering torque in a direction indicated by an arrow a shown in FIG. 6A is inputted to the steering shaft 29, the torsion bar 38 twists and deforms and a difference in phase is generated between the steering shaft 29 and the pulley shaft 32 (namely, the slider 42 which cannot rotate relative to the pulley shaft 32), whereby the slider 42 is pushed along the inclined groove 42$a$ by the guide pin 43 of the steering shaft 29 to slide upwardly. As a result, the output voltage of the upper first secondary coil 49 increases whereas the output voltage of the lower second secondary coil 50 decreases, and the steering torque which is directed to the right is detected based on a difference in voltage between the two coils. Similarly, when the steering wheel is operated leftward so that a steering torque in a direction indicated by an arrow b shown in FIG. 6C is inputted to the steering shaft 29, the torsion bar 38 twists and deforms and a difference in phase is generated between the steering shaft 29 and the pulley shaft 32 (namely, the slider 42), whereby the slider 42 is pushed along the inclined groove 42$a$ by the guide pin 43 of the steering shaft 29 to slide downwardly. As a result, the output voltage of the upper first secondary coil 49 decreases whereas the output voltage of the lower second secondary coil 50 increases, and the steering torque which is directed to the left is detected based on a difference in voltage between the two coils.

Thus, when a steering torque is detected by the steering torque sensor 41, the control unit 18 drives the actuator 20 such that the steering torque detected by the steering torque sensor 41 is held at a pre-set steering torque, whereby the torque of the actuator 20 is transmitted to the pulley shaft 70 via the worm 83 and the worm wheel 82 to thereby assist the steering wheel operation or steering effort by the driver. By the combination of the steering torque sensor 41 having the differential transformer 45 and the actuator 20, the actuator 20 can be operated only through electric control, whereby the construction of the control system can be simplified.

Thus, while the embodiment of the invention has been described in detail heretofore, the invention may be modified variously with respect to its design without departing from the spirit and scope of the invention.

For example, while the serrated portions 33$a$, 71$a$ are adopted as the detent portions in the embodiment, projections or irregular portions of any configurations may be adopted instead of the serrated portions 33$a$, 71$a$.

In addition, while the bottom portions of the pin holes 34$a$, 77$a$ reach the surfaces of the pulley bosses 33, 71 in the embodiment, the bottom portions of the pin holes 34$a$, 77$a$ may be constructed to terminate just before the surfaces of the pulley bosses 33, 71 so that the existence of the serrated portions 33$a$, 71$a$ can also be confirmed through a translucent thin portion of a synthetic resin which constitutes the drive pulley 34 or the driven pulley 77.

Additionally, even in the event that the drive pulley main body 34 and the driven pulley main body 77 are constructed of a transparent synthetic resin, the existence of the serrated portions 33$a$, 71$a$ can also be confirmed.

Thus, according to the first aspect of the invention, since at least part of the detent portions formed on the outer circumference of the metallic pulley bosses can be visualized from the outside of the drive pulley main body or the driven pulley main body which is molded of the synthetic resin in such a manner as to cover the detent portions, it is possible to surely confirm any lack of formation of a detent portion on the pulley boss due to a processing error.

According to the second aspect of the invention, since part of the detent portions can be visualized through the recessed portions formed for fixing the end portions of the operation cables to the drive pulley main body or the driven pulley main body, it is possible to surely confirm the existence of the detent portions on the pulley bosses without implementing any particular or extra processing to the pulley main bodies.

What is claimed is:

1. A cable type steering system, comprising:
    a drive pulley coupled to a steering wheel for rotation and having a drive pulley main body;
    a driven pulley coupled to a steering gear box for steering wheels for rotation and having a driven pulley main body; and
    an operation cable connecting the drive pulley with the driven pulley, so that a steering torque inputted to the steering wheel is transmitted to the steering gear box via the operation cable,
    wherein at least one of the drive pulley main body and the driven pulley main body is molded of a synthetic resin in such a manner as to cover a detent portion formed on an outer circumference of a pulley boss both from an axial direction and a radial direction, and
    wherein at least part of the covered detent portion is visible from outside of the covering pulley main body.

2. The cable type steering system according to claim 1, wherein at least part of the detent portion is visible through a recessed portion formed in said covering pulley main body for fixing an end portion of the operation cable to one of the drive pulley main body and the driven pulley main body.

3. The cable type steering system according to claim 1, wherein both the drive pulley main body and the driven pulley main body are molded of a synthetic resin in such a manner as to cover detent portions formed on outer circumferences of associated pulley bosses both from an axial direction and a radial direction, and wherein at least part of the covered detent portions are visible from outside of the covering pulley main bodies.

4. The cable type steering system according to claim 1, wherein the detent portion is a serrated portion.

5. A cable type steering system, comprising:

at least one of a drive pulley main body and a driven pulley main body covering a detent portion formed on an outer circumference of a pulley boss both from an axial direction and a radial direction, wherein at least part of the detent portion is visible from outside of the associated said at least one of the drive pulley main body and the driven pulley main body.

6. The cable type steering system according to claim 5, wherein the at least one of a drive pulley main body and a driven pulley main body are molded of synthetic resin.

7. The cable type steering system according to claim 5, further including an operation cable, and at least part of the detent portion is visible through a recessed portion formed in said associated pulley main body for fixing an end portion of the operation cable to one of the drive pulley main body and the driven pulley main body.

8. The cable type steering system according to claim 5, wherein both the drive pulley main body and the driven pulley main body cover detent portions formed on outer circumferences of associated pulley bosses both from an axial direction and a radial direction, wherein at least part of the detent portions are visible from outside of the associated drive pulley main body and the driven pulley main body.

9. The cable type steering system according to claim 5, wherein the detent portion is a serrated portion.

* * * * *

UNITED STATES PATENT AND TRADEMARK OFFICE
CERTIFICATE OF CORRECTION

PATENT NO. : 6,752,424 B2
APPLICATION NO. : 10/268368
DATED : June 22, 2004
INVENTOR(S) : Shimizu et al.

It is certified that error appears in the above-identified patent and that said Letters Patent is hereby corrected as shown below:

Title page:
  Item (54), the title, change "CABLE TYPE" to --CABLE-TYPE--.
  Item (57), the "ABSTRACT", 1st line, change "cable type" to --cable-type--.

Column 1:
  Line 1, change "CABLE TYPE" to --CABLE-TYPE--.
  Line 6, line 10, line 15, and line 19, change "cable type" to --cable-type--.
  Lines 23-24, delete "due to the reason".
  Line 46, line 49, line 51, and line 57, change "cable type" to --cable-type--.
  Line 61, change "pulley boss" to --pulley boss(es)--.
  Line 62, delete "(es)".

Column 2:
  Line 8, change "cable type" to --cable-type--.

Column 4:
  Line 65, change "are waterproof" to --are of a waterproof--.

Column 6:
  Line 25, change "covers from most" to --covers most--.

Column 7:
  Line 1, change "resistance and therefore," to --resistance and, therefore,--.
  Line 35, change "becomes equal" to --become equal--.

Column 8:
  Line 45 and line 63, change "cable type" to --cable-type--.

Column 9:
  Line 1, line 10, and line 12, change "cable type" to --cable-type--.

CERTIFICATE OF CORRECTION (continued)
U.S. Pat. No. 6,752,424 B2

Column 10:
    Line 1, line 4, line 10, and line 17, change "cable type" to --cable-type--.

Signed and Sealed this

Twenty-third Day of February, 2010

David J. Kappos
*Director of the United States Patent and Trademark Office*